Jan. 15, 1963 C. E. MONGAN 3,073,149
METHOD AND APPARATUS FOR EVALUATING IMPEDANCE
CHARACTERISTICS OF POROUS MATERIALS
Filed Dec. 30, 1959 2 Sheets-Sheet 1

United States Patent Office 3,073,149
Patented Jan. 15, 1963

3,073,149
METHOD AND APPARATUS FOR EVALUATING IMPEDANCE CHARACTERISTICS OF POROUS MATERIALS
Charles E. Mongan, 69 Dunster St., Cambridge 38, Mass.
Filed Dec. 30, 1959, Ser. No. 862,837
9 Claims. (Cl. 73—38)

This invention relates to a method and apparatus for measuring and evaluating the flow of fluids through porous materials such as geologic deposits under dynamic conditions and for ascertaining the impedance characteristics presented by such materials to the flow of fluids.

The study of the movement of fluids through geologic deposits and similar porous materials is becoming increasingly significant due to the necessity for discovering new and adequate sources of supply of liquids such as oil and water for example; and also due to the concern relative to the conditions and precautions necessary for the proper control and disposal of certain materials such as atomic wastes without injury to people or the surrounding environment. The movement of fluids through such porous materials is believed to be capillary in nature and while extensive studies have been made on the flow of liquids under capillary conditions, such studies have been almost exclusively from the point of view of the steady state.

Accordingly, it is a principal object of this invention to provide a novel method and apparatus for measuring and evaluating the flow of fluids through samples of porous materials such as geologic deposits under varying conditions to provide results useful in the determination of the impedance characteristics of such materials to the flow of specific fluids.

Another object of the invention is to provide apparatus in which the flow of fluids through porous materials may be carried out under controlled and predetermined varying conditions in a manner such that numerous tests may be easily made and such that the results are available readily.

In accordance with the invention a sample of the porous material to be evaluated is enclosed in a holder and is subjected to a predetermined series of varying pressure conditions. Continuous observations and measurements relating to the resultant flow through the sample and of instantaneous pressures at selected points in the sample are recorded. The apparatus for practicing the invention enables effects of the varying pressure conditions within the sample to be accurately observed with a continuous record thereof being made so that empirical formulae for analyzing and characterizing the behavior of such porous materials may be obtained. In the preferred embodiment a sample of the porous material is placed in an elongated tubular sample holder under conditions similar to those in which the material exists in nature. This sample holder is disposed in communication with a cylinder which includes a free piston that divides the cylinder into two sections. One section, in communication with the sample holder, is adapted to contain the specimen fluid to which the sample is to be subjected and the second section contains the control fluid by means of which the varying pressure conditions are applied to the specimen fluid to produce flow through the sample. The control fluid is applied to the cylinder according to a predetermined program of varying pressures which when plotted against time produces a curve which is generally saw tooth in nature, sinusoidal or otherwise as desired. A fluid pressure feedback loop, responsive to the specimen fluid pressure, is utilized to compare that pressure with the programmed value and institute corrective action as necessary. Pressure and flow measurements are continuously recorded and correlated with the varying pressure as applied by the control fluid, thus enabling the calculation of equations which define the transient behavior of the sample material when subjected to the specimen fluid. The invention thus provides a method and apparatus for the testing of and the determination of the impedance of geologic deposits and similar porous materials and is valuable in providing an evaluation of such materials from a hitherto unexamined point of view.

Other objects and advantages of the invention will be seen as the following description of a preferred embodiment thereof progresses in conjunction with the drawings, in which.

Figure 1:
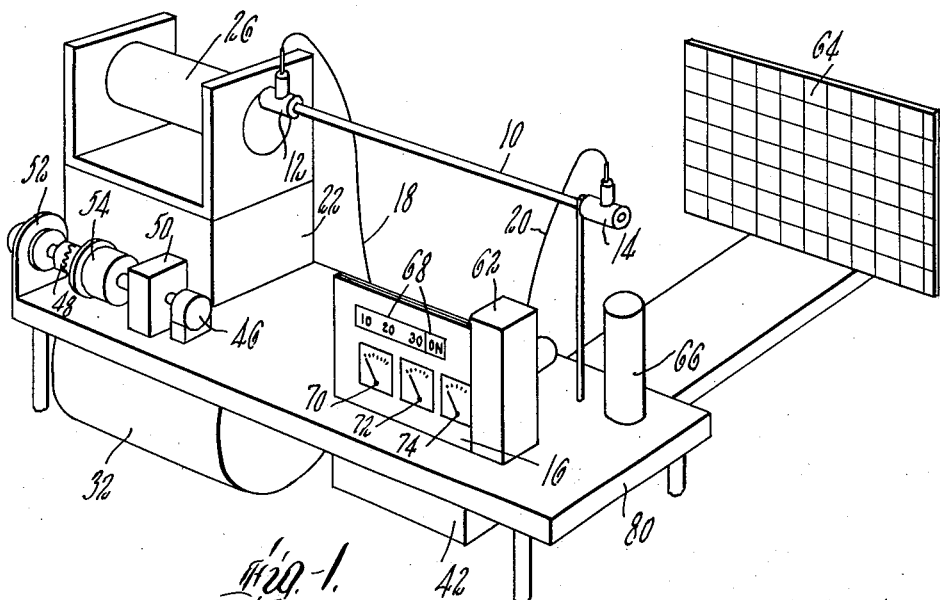
FIG. 1 is a perspective view of the impedance analyzing apparatus according to the preferred embodiment of the invention.
Figure 2:
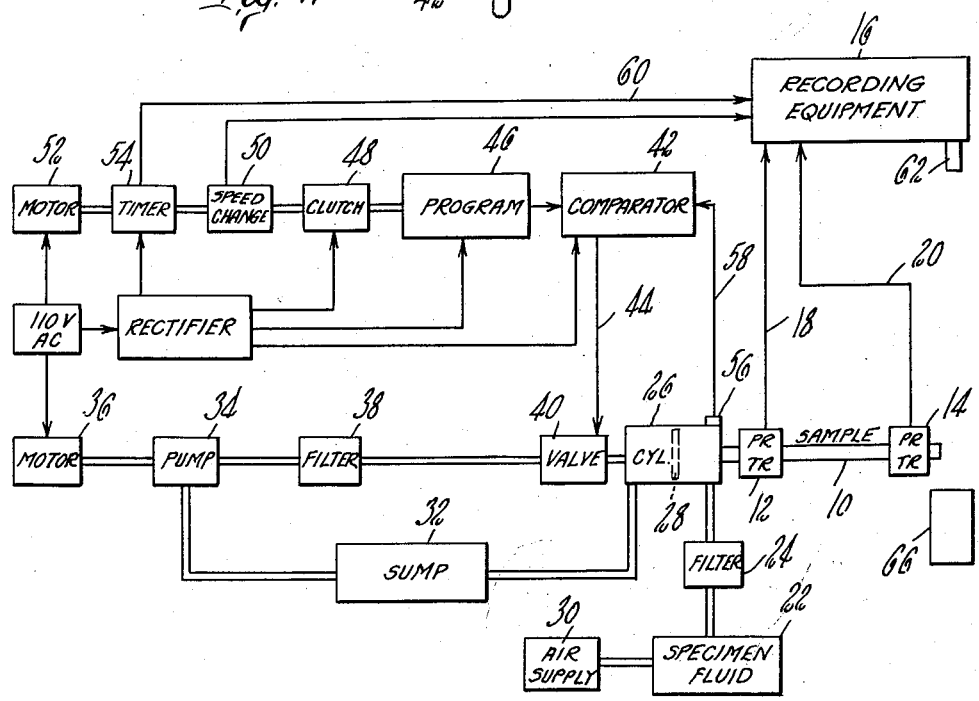
FIG. 2 is a block diagram of the apparatus of FIG. 1 indicating certain of the electrical and hydraulic circuitries employed in that apparatus.

The physical positions of various elements of the impedance analyzer according to the preferred embodiment of the invention are illustrated in perspective view in FIG. 1 and the logical organization and function of certain of these elements are shown in FIG. 2. Corresponding items in the two figures are assigned the same reference numerals. As indicated in those figures there is provided a tubular sample holder 10 several feet in length in which the material to be tested is contained under the proper conditions for determining the impedance characteristics of the material. The sample holder may be packed with the material, such as gravel, or a core sample of soil may be positioned within the tube, for example. The internal dimensions of this sample holder may be capillary in nature or it may be several inches in diameter depending upon the type of material and the characteristics desired to be ascertained. Pressure transducers 12, 14, located adjacent each end of the sample holder, provide an indication of the pressure at the selected points therein. These transducers in the preferred embodiment are barium titanate type elements which are sensitive to small changes of pressure and provide an electrical signal indicative of such changes. The output signals of the transducers are applied to the recording element 16 over lines 18 and 20 respectively.

The specimen fluid which is to be applied to the porous material contained in the sample holder is stored in a tank 22 and is applied through a filter 24 to the cylinder 26. This cylinder contains a free piston 28 which divides the cylinder into two sections. The right hand end of the cylinder, to which the specimen fluid is applied, is adapted to be connected to the sample holder. In the resetting of the device preparatory to a test air pressure from supply 30 is applied to the specimen fluid container 22 to force fluid through the filter device into the right end section of cylinder 26, thereby driving the piston 28 toward the left end of the cylinder. This is a resetting operation which prepares the apparatus for the flow test of the fluid through the sample under transient conditions.

The left end of the cylinder is adapted to receive the control fluid which is preferably a standard hydraulic fluid. The circuitry which supplies this control fluid includes a storage sump 32 from which the control fluid is pumped by pump 34 as driven by motor 36 through a filter 38 and a valve 40 to the right end of the cylinder to gradually move the piston 28 toward the right end of the cylinder and thus apply the specimen fluid to the sample in the holder 10. It will be understood that suitable valving which is not specifically shown in the drawings is provided for the control of the flow of these fluids. For example a valve is positioned in the line connecting the cylinder 26 with the sump 32 which is closed when the control fluid is being applied under pressure program for applying fluid to the sample. In addition an accumulator, precharged to a suitable intermediate pressure, may be utilized in either the specimen fluid system or the control fluid system, or both for smoothing out any transients that may be introduced.

The variable pressure application of the control fluid to the cylinder 26 according to a predetermined program of pressures is achieved through manipulation of the solenoid operated valve 40. A control signal is applied to the valve 40 from a comparator circuit 42 over line 44. The comparator receives a signal from a programming element 46 which in the preferred embodiment is a precision potentiometer. The movable arm of this potentiometer is moved mechanically through a drive including a magnetic clutch 48, a speed changing mechanism 50 and a motor 52. The motor 52 also drives a timing disk element in the timing circuit 54. By suitable selection of the potentiometer a signal voltage which has the desired waveform and frequency is applied through the comparator circuit 42 for controlling the valve 40. The valve 40 is operated in accordance with this signal to apply a varying amount of control fluid to the piston 28 in the cylinder 26 to move that piston toward the right and apply the specimen fluid to the material in the sample holder 10. A pressure transducer 56, mounted on the right end of the cylinder 26, senses the pressure that is applied by the control fluid to the specimen fluid and a signal is fed back by this transducer 56 to the comparator over line 58. This feedback signal is compared with the signal from the programming element and any difference sensed by the comparator is utilized to appropriately adjust the valve 40 for insuring the application of the predetermined transient pressure conditions to the material in the sample holder 10.

As mentioned above, the motor which drives the programming element also drives a timing element 54 and that element provides signals over line 60 to the recording equipment indicative of the progress of the test. In the preferred embodiment this timer produces signals at 10 millisecond and 100 millisecond intervals. The recording equipment is adapted to magnetically record the signals applied over lines 18, 20 and 60 and to photographically record the transient conditions of flow of the specimen fluid through the sample. This is accomplished through the utilization of a high-speed motion picture camera indicated diagrammatically at 62. This motion picture camera is positioned to photograph the flow of fluid from the right end (outlet) orifice of the sample holder and, to aid in the evaluation of the instantaneous flow characteristics as recorded by the camera, a grid 64 is positioned directly behind the outlet orifice of the sample holder in line with the motion picture camera lens. The specimen fluid is collected in a graduated vessel 66.

As is indicated in FIG. 1, in the recording equipment section, there is also provided a panel on which are mounted signal lights 68 indicative of the status of the motor 52 and the position of the speed changer 50 and three meters 70, 72 and 74 which provide a visual indication of the instantaneous pressures as sensed by the transducers 12, 14 and 56. Provision for a recording oscilloscope (not shown) or similar equipment is also available. The entire apparatus is shown mounted on a table 78 with the sump 32, and comparator 42 and associated rectifying circuitry mounted beneath the table. Certain of the hydraulic equipment utilized such as the pumps and filters and the storage tank for the specimen fluid are not visible in the perspective view of FIG. 1.

In operation a sample of material such as gravel is placed in the sample holder 10 and that holder is horizontally disposed in communication with the right end of cylinder 26. The specimen fluid is then introduced into the cylinder and the piston 28 is moved toward the left as seen in a resetting operation in FIG. 2. This operation removes the control fluid from the left end of the cylinder and returns it to the sump 32. The apparatus is then in readiness for the performance of an impedance test on the sample. The pump motor 36 and the control motor 52 are then switched on and timing signals are applied to the recording equipment from timer 54. The pump 34 applies the control fluid through the filter 38 to the valve 40. When the magnetic clutch 48 is engaged the programmer element 46 generates a varying signal that is applied through the comparator 42 to control the operation of the valve 40 which enables the application of the hydraulic fluid to the cylinder 26 to drive the piston 28 towards the right end of the cylinder. This varying pressure is applied to the specimen fluid to cause its flow through the material in the sample holder 10. Continuous measurements of the instantaneous pressures by the transducers are transmitted to the recording equipment and the motion picture camera 62 is operated to record the flow of the fluid at the outlet orifice of the sample holder. Accurate control of the valve in accordance with the programmed values is assured through the fluid pressure feedback circuit from the transducer 56 and through the comparator 42. With the information available as a result of each test it is possible to calculate an exponential equation which represents the impedance of the material under test to the flow of the specimen fluid. Among the other data obtained in tests utilizing a sawtooth input having a ten second cycle of applied pressure through the range from zero to fifty p.s.i. the output trajectory of the specimen fluid has observable humps, due to transient velocity increases, the velocities of which directly indicate the instantaneous exit velocity of the fluid under test. This is recorded by the high speed motion picture camera which photographs the flow trajectory against the background of the grid.

Figure 3:
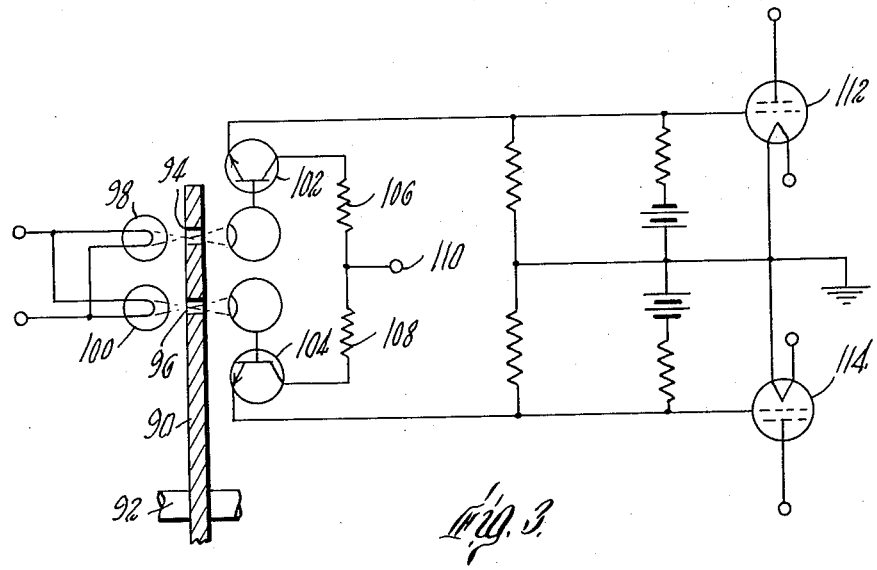
FIG. 3 is a schematic diagram of the timing apparatus used in conjunction with the impedance analyzer of FIG. 1.

A schematic view of the timing element is shown in FIG. 3. This timing element includes a disk 90 which is driven by the motor 52 through the shaft 92. The disk includes two rows of apertures 94, 96. Two incandescent lamps 98, 100 are disposed on one side of the disk adjacent the rows. On the opposite side of the disk opposite these lamps are light sensitive elements of phototransistors 102 and 104. The collectors of the transistors are connected through resistors 106 and 108 respectively to a regulated D.C. voltage source at terminal 110. The emitters of the transistors are connected to the grids of mercury flash tubes 112 and 114 respectively. These mercury flash tubes may be type 6973 and each produces a blue flash whenever the voltage applied to its grid reaches a predetermined value. Thus, the light sensed by the photo-transistor when an aperture in disk 92 is aligned with a corresponding lamp is amplified by the transistor and applied to the flash tube associated with it to provide a timing indication. Apertures in row 94 pass the lamp 98 at 10 millisecond intervals and apertures in row 96 pass the lamp 100 at 100 millisecond intervals.

Figure 4:
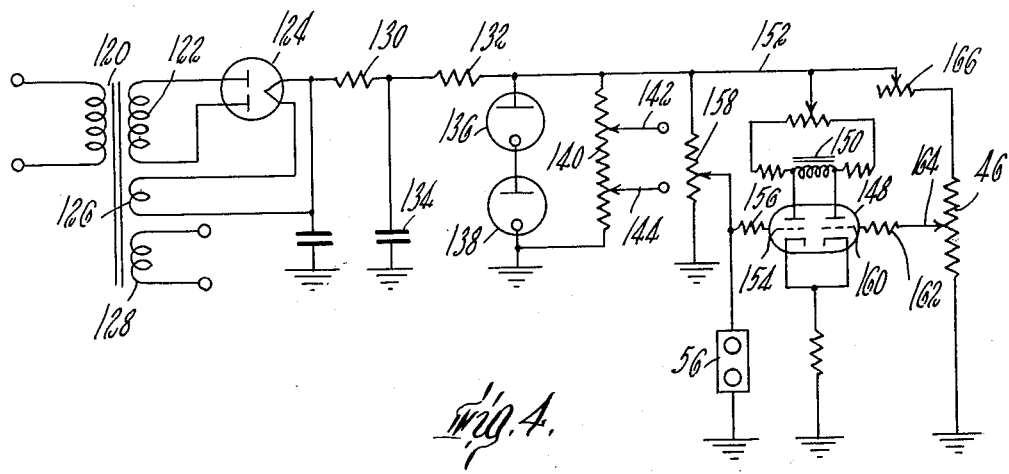
FIG. 4 is a schematic diagram of the comparator circuit utilized in the impedance analyzer of FIG. 1.

A schematic diagram of the rectifier and comparator circuitry utilized in the preferred embodiment is shown in FIG. 4. A standard 110 volt A.C. signal is applied to the primary winding of a transformer 120. A first transformer secondary winding 122 applies a stepped up voltage to the plates of a rectifier tube 124. Transformer secondary winding 126 applies voltage to the filament of the rectifier tube and a third secondary winding 128 provides 6.3 volt signals for operation of the incandescent lamps 98 and 100 in the timing circuit. The rectified output of the rectifier tube 124 is filtered and smoothed by the filter circuit consisting of resistors 130 and 132 and capacitor 134 and applied to a voltage regulating circuit comprising the two regulator tubes 136, 138.

A voltage divider 140 is connected across the output of the regulator tubes between ground and the high potential terminal (+210 volts). The tap 142 provides a 65 volt D.C. regulated signal which is applied to the plates of the flash tubes 112 and 114 in the timing circuit and the tap 144 provides a regulated +22 volt D.C. signal which is applied via terminal 110 to the collectors of the photo-transistors 102, 104.

The comparator circuit shown at the right side of the FIG. 4 includes a twin triode vacuum tube. The plates of this tube are connected through an inductance 150 and a resistive network to the high voltage line 152. One grid of tube 148 is connected through a resistance 156 to the pressure sensing element 56 associated with the cylinder 26, with the voltage on this element being capable of adjustment by means of potentiometer 158. The grid 160 of the other triode in tube 148 is connected through a resistance 162 in the shaft driven movable arm 164 of the precision potentiometer which functions as the programming element 46. The high voltage terminal of the potentiometer is connected through adjusting potentiometer 166 to the high voltage line 152; the other terminal is grounded. A varying voltage is applied from the potentiometer to the grid 160 as the movable arm 164 is driven by the motor 52 and the tube 148 supplies an output signal indicative of this to control the operation of valve 40. The pressure indication signal fed back to the other grid 154 of tube 148 from the transducer 56 and any necessary correcting signal is generated across the coil 150 of the relay which controls the operation of valve 40.

Thus it will be seen that the method and apparatus according to this invention provides means for determining the transient impedance of porous materials such as geological samples under conditions of varying flow of particular fluids through them. The apparatus is compact and repetitive tests under known conditions may be readily performed with the useful data being accurately and contemporaneously recorded. While a preferred embodiment of the invention has been shown and described it will be understood that the invention is not intended to be limited thereto or to details thereof and departures may be made therefrom within the spirit and scope of the invention as defined in the claims.

I claim:

1. The method of determining impedance characteristics of a material to the flow of a specific fluid, comprising the steps of encasing a sample of said material in an elongated tubular sample holder, applying said specific fluid to the sample in said holder according to a predetermined program of continuously varying pressures to cause a flow of said fluid through said sample, and measuring and recording data representative of the flow and pressure characteristics produced as a result of the flow of said fluid through the sample in said holder.

2. The method of determining impedance characteristics of a material to the flow of specific fluid comprising the steps of encasing a sample of said material in an elongated sample holder, placing said sample holder in communication with a source of said specific fluid, applying pressure by means of a control fluid to said specific fluid according to a predetermined program of varying pressures to cause a flow of said specific fluid through said sample, sensing instantaneous pressures applied to said sample by said specific fluid, comparing that said instantaneous pressures with the corresponding instantaneous programmed pressures and appropriately adjusting the control fluid as required so that the pressure of specific fluid appropriately corresponds with the programmed pressure, and measuring and recording data representative of the flow and the pressure characteristics as the result of the flow of said specific fluid through said sample holder.

3. Apparatus for determining the impedance characteristics of a material comprising a sample holder in the form of an elongated tube having a passageway therethrough, said sample holder being adapted to receive a sample of the material to be tested, pressure transducer means positioned adjacent said holder for providing signals indicative of varying pressure conditions in said sample, means for applying a specific fluid to said sample under pressure, valve means for controlling the application of said fluid to said sample, a programming element adapted to provide signals representative of a predetermined program of pressures, means responsive to said programming element adapted to control the position of said valve so that said fluid is applied to said sample according to said predetermined program of pressures, and recording equipment for contemporaneously recording fluid and pressure characteristics in the sample under test, said apparatus being adapted to provide data enabling the calculation of the impedance of said sample to said specific fluid.

4. The apparatus as claimed in claim 3 wherein said programming element is adapted to generate signals indicative of a desired cycle of pressures and further including a comparator circuit adapted to compare the signal provided by said programming element with signals from said transducer means and to generate signals to appropriately control said valve.

5. The apparatus as claimed in claim 3 and further including a fluid pressure feedback loop from the input end of said sample holder and means responsive to said loop and to said programming element adapted to adjust the pressure of said specimen fluid as applied to said sample in accordance with the instantaneous programmed value.

6. Apparatus for determining impedance characteristics of a material comprising a sample holder in the form of an elongated tube having a passageway therethrough, said holder being adapted to receive a sample of the material to be tested, a plurality of pressure transducers positioned at spaced intervals on said holder for providing indication of varying pressure conditions in said sample, pressure applying means for applying a specific fluid to said sample in said holder comprising a cylinder having a free piston mounted therein which divides said cylinder into two sections, one section of said cylinder being adapted to be connected to said holder so that fluid may be transferred from said one section to said holder, means to place said specific fluid in said one section, means to apply control fluid to the second section of said piston, valve means for controlling the application of said control fluid to said second section, a programming element adapted to control the position of said valve so that said specimen fluid is applied to said sample according to a predetermined program of pressures, and a comparator circuit adapted to sense the pressure of the specimen fluid on said sample and to correct the positioning of said control valve for providing the desired program of pressure characteristics, and recording equipment including a timer and photographic means for contemporaneously recording the flow of fluid through said sample and pressures as indicated by said transducers, said apparatus being adapted to provide data enabling the calculation of the impedance of said sample to said specific fluid.

7. The apparatus as claimed in claim 6 wherein said timer includes elements driven in coordination with said programming element and is adapted to provide periodic digital timing information to said recording equipment.

8. The apparatus as claimed in claim 6 wherein said comparator circuit includes an output pressure transducer and said programming element includes a precision potentiometer which is adapted to provide a varying voltage signal which is applied to said comparator circuit for comparison with a signal fed back from said output pressure transducer.

9. Apparatus for determining the impedance characteristics of a material comprising a sample holder in the form of an elongated tube having a pasageway therethrough, said sample holder being adapted to receive a sample of the material to be tested, pressure transducer means positioned adjacent said holder for providing signals indicative of varying pressure conditions in said sample holder, means for applying a specific fluid under pressure to the material in said sample holder, a programming element adapted to provide signals representative of a predetermined program of cyclically varying pressures, means responsive to signals provided by said programming element to control said fluid applying means so that said specific fluid is applied to said sample holder according to said predetermined program of cyclically varying pressures, and recording means for contemporaneously recording flow and pressure characteristics in the sample under test, said apparatus being adapted to provide data enabling the calculation of the impedance of the material in said sample holder to the flow of said specific fluid.

References Cited in the file of this patent
UNITED STATES PATENTS

| | | |
|---|---|---|
| 2,715,331 | Yates et al. | Aug. 16, 1955 |
| 2,737,804 | Herzog et al. | Mar. 13, 1956 |